(12) United States Patent
Zhuang et al.

(10) Patent No.: US 12,177,183 B2
(45) Date of Patent: Dec. 24, 2024

(54) INFORMATION REPORTING METHOD, DATA PROCESSING METHOD, AND APPARATUS

(71) Applicant: Huawei Technologies Co., Ltd., Shenzhen (CN)

(72) Inventors: Shunwan Zhuang, Beijing (CN); Haibo Wang, Beijing (CN); Yunan Gu, Beijing (CN); Gang Yan, Beijing (CN); Zhenbin Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 300 days.

(21) Appl. No.: 17/732,588

(22) Filed: Apr. 29, 2022

(65) Prior Publication Data
US 2022/0263803 A1    Aug. 18, 2022

Related U.S. Application Data

(63) Continuation of application No. PCT/CN2020/125227, filed on Oct. 30, 2020.

(30) Foreign Application Priority Data

Oct. 31, 2019    (CN) .......................... 201911053999.5

(51) Int. Cl.
*H04L 29/06*    (2006.01)
*H04L 9/40*    (2022.01)

(52) U.S. Cl.
CPC ........ *H04L 63/0263* (2013.01); *H04L 63/029* (2013.01); *H04L 63/1425* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 2011/0093612 A1 | 4/2011 | Murakami | |
| 2018/0367396 A1 | 12/2018 | Kompella et al. | |
| 2019/0140960 A1 | 5/2019 | Liang et al. | |

FOREIGN PATENT DOCUMENTS

| | | | | |
|---|---|---|---|---|
| CN | 101369909 A | | 2/2009 | |
| CN | 102158469 A | * | 8/2011 | |
| CN | 104734949 A | | 6/2015 | |
| CN | 107592270 A | | 1/2018 | |
| CN | 108881041 A | | 11/2018 | |
| CN | 108924049 B | * | 12/2020 | ............. H04L 45/38 |

(Continued)

OTHER PUBLICATIONS

P. Marques et al.,"Dissemination of Flow Specification Rules," Aug. 2009, RFC 5575, 22 pages.

(Continued)

*Primary Examiner* — Andrew J Steinle
(74) *Attorney, Agent, or Firm* — Conley Rose, P.C.

(57) ABSTRACT

An information reporting method includes after receiving a Border Gateway Protocol (BGP) flow specification (FS) rule, a network node obtains a status of implementing the BGP FS rule on the network node, where the status indicates that either the BGP FS rule is implemented on the network node or the BGP FS rule is not implemented on the network node. Then the network node sends the status to a server.

20 Claims, 5 Drawing Sheets

(56) References Cited

FOREIGN PATENT DOCUMENTS

| JP | 2018029303 A | 2/2018 | |
|---|---|---|---|
| JP | 2018125745 A | 8/2018 | |
| WO | 2015138767 A1 | 9/2015 | |
| WO | 2017167029 A1 | 10/2017 | |
| WO | WO-2018000443 A1 * | 1/2018 | ........... H04L 45/306 |
| WO | 2018170901 A1 | 9/2018 | |
| WO | 2019138414 A1 | 7/2019 | |

OTHER PUBLICATIONS

Y. Rekhter, Ed et al., "A Border Gateway Protocol 4 (BGP-4)," RFC 4271, Obsoletes: 1771, Jan. 2006, 104 pages.

J. Scudder, Ed et al., "BGP Monitoring Protocol (BMP)," RFC 7854, Jun. 2016, 27 pages.

* cited by examiner

US 12,177,183 B2

INFORMATION REPORTING METHOD, DATA PROCESSING METHOD, AND APPARATUS

CROSS-REFERENCE TO RELATED APPLICATIONS

This application is a continuation of International Patent Application No. PCT/CN2020/125227 filed on Oct. 30, 2020, which claims priority to Chinese Patent Application No. 201911053999.5 filed on Oct. 31, 2019. The disclosures of the aforementioned applications are hereby incorporated by reference in their entireties.

TECHNICAL FIELD

This application relates to the communications field, and in particular, to an information reporting method, a data processing method, and an apparatus.

BACKGROUND

With the development of communications technologies, some communications security problems appear. For example, a network attack occurs on a communications device. Correspondingly, some policies for preventing network attacks also appear. One policy for preventing network attacks is a Border Gateway Protocol (BGP) flow specification (FS). In the BGP FS, a BGP FS route can be transmitted to a BGP FS peer such as a network node, to transmit a BGP FS rule, so that traffic can be controlled at the network node to prevent attack traffic.

However, in a conventional technology, the BGP FS cannot effectively prevent the attack traffic. Therefore, an urgent solution is required to resolve the foregoing problem.

SUMMARY

Embodiments of this application provide an information reporting method, to resolve a problem that a traffic attack cannot be effectively prevented according to a BGP FS rule.

According to a first aspect, the embodiments of this application provide an information reporting method. In a conventional technology, after a server that generates a BGP FS rule sends the BGP FS rule to a network node, a control procedure related to the BGP FS rule ends, and no measure is taken to further monitor a status of implementing the BGP FS rule on the network node. As a result, the status of implementing the BGP FS rule on the network node is unknown. Further, the BGP FS rule cannot effectively prevent attack traffic because the BGP FS rule may not be implemented on the network node. To resolve this problem, in the embodiments of this application, after receiving the BGP FS rule, the network node may obtain the status of implementing the BGP FS rule on the network node, where the status may indicate that the BGP FS rule is implemented on the network node, or indicate that the BGP FS rule is not implemented on the network node. Then the network node sends the status to a server. In this way, the server can learn of the status of implementing the BGP FS rule on the network node. Correspondingly, the server or another server, for example, the server that generates the BGP FS rule, may store the status, and may further perform a corresponding operation based on the status if necessary, for example, perform corresponding adjustment, to effectively prevent attack traffic.

In an implementation, in actual application, if a function of monitoring a BGP FS local-routing information base (RIB) through BGP Monitoring Protocol (BMP) is deployed on the network node, after receiving a BGP FS route, the network node reports the BGP FS route to a BMP server. In addition, the network node may report the received BGP FS route to the BMP server by using a route monitoring (RM) message. In view of this, the network node may use the RM message as a carrier, and send an RM message including the status of implementing the BGP FS rule on the network node to a first server. Further, the network node may add the status of implementing the BGP FS rule on the network node to the RM message, and then send the RM message to which the status is added to the first server.

In an implementation, when the function of monitoring a BGP FS local-RIB through BMP is not deployed on the network node, because the function of monitoring a BGP FS local-RIB through BMP is not deployed on the network node, the network node does not send the BGP FS route to the first server. Correspondingly, the status of implementing the BGP FS rule on the network node cannot be sent to the first server through the RM message. In this case, the first server may send a status report instruction to the network node. The status report instruction is used to instruct the network node to report the status of implementing the BGP FS rule on the network node to the first server. In other words, after receiving the status report instruction from the first server, the network node may obtain the status of implementing the BGP FS rule on the network node, and send the obtained status to the first server.

In an implementation, to enable the status to reflect more details of implementation of the BGP FS rule on the network node, the BGP FS rule being implemented on the network node may include at least two cases: normal implementation and abnormal implementation. The normal implementation means that the BGP FS rule has correctly participated in a BGP best path selection process, and the BGP FS rule is not interfered by another factor when being implemented. The abnormal implementation means that the BGP FS rule has correctly participated in a BGP best path selection process, but the BGP FS rule is interfered by another factor when being implemented. Therefore, the BGP FS rule being implemented on the network node may include either BGP FS rule is normally implemented on the network node, or the BGP FS rule is abnormally implemented on the network node.

In an implementation, in actual application, other traffic control policies may be further run on the network node. If a priority of the BGP FS rule is lower than those of the other traffic control policies, these other traffic control policies interfere with the implementation of the BGP FS rule on the network node, because traffic passing through the network node is first processed by the other traffic control policies and then processed by the BGP FS rule. In other words, the BGP FS rule being abnormally implemented on the network node may mean that the priority of the BGP FS rule is lower than those of the other traffic control policies.

In an implementation, when the status is that the BGP FS rule is not implemented on the network node, to enable the status to further reflect a reason why the BGP FS rule is not implemented on the network node, the status may further reflect a specific reason why the BGP FS rule is not implemented on the network node. Further, after obtaining the BGP FS rule, the network node first verifies the BGP FS rule, and the network node can implement the BGP FS rule only after the BGP FS rule succeeds in the verification. The verification performed on the BGP FS rule may include BGP verification and/or BGP FS verification. If the BGP FS rule fails in the BGP verification, or the BGP FS rule fails in the BGP FS verification, the network node no longer implements the BGP FS rule. Therefore, the BGP FS rule being not implemented on the network node may include that BGP FS rule fails in the BGP verification, and/or the BGP FS rule fails in the BGP FS verification.

In an implementation, the BGP FS rule failing in the BGP verification may be that the BGP FS rule carries an invalid parameter. The invalid parameter may include at least two cases. One is that a parameter that cannot be processed by the network node exists in the BGP FS rule, and the other is that an invalid autonomous system path exists in the BGP FS rule.

In an implementation, the network node may usually include one or more interfaces, and the BGP FS rule usually carries an effective interface of the BGP FS rule. If the effective interface carried in the BGP FS rule does not match the interface of the network node, the BGP FS rule cannot be implemented on the network node. Therefore, the BGP FS rule being not implemented on the network node may be that the effective interface carried in the BGP FS rule does not match the interface of the network node. In addition, in actual application, a corresponding security protection policy may be further configured on the network node. If the BGP FS rule conflicts with the security protection policy, the BGP FS rule cannot be implemented on the network node. Therefore, the BGP FS rule being not implemented on the network node may be that the BGP FS rule conflicts with the security protection policy. In addition, usually, a preset implementation condition may be further set on the network node for the BGP FS rule, and the network node can implement the BGP FS rule only when the BGP FS rule meets the preset implementation condition. Therefore, the BGP FS rule being not implemented on the network node may be that the BGP FS rule does not meet the preset implementation condition.

In an implementation, when the BGP FS rule is implemented on the network node, in order to further evaluate a traffic control effect of the BGP FS rule, the network node may further obtain traffic matching information of the BGP FS rule, and send the traffic matching information to the first server. The traffic matching information is related information of data traffic matching the BGP FS rule.

In an implementation, if a function of monitoring a BGP FS local-RIB through BMP is deployed on the network node, after receiving a BGP FS route, the network node reports the BGP FS route to a BMP server. A type of message sent by the network node to the BMP server is an SR message. The SR message carries statistics information, and the traffic matching information may also be considered as statistics information. In view of this, the traffic matching information may be sent to the first server by using the existing SR message as a carrier. In other words, the network node may add the traffic matching information of the BGP FS rule to the SR message, and then send an SR message to which the traffic matching information is added to the first server. Further, the network node may use an extension field of the SR message to carry the traffic matching information. For example, the traffic matching information may be carried in an extended TLV field.

In an implementation, when the function of monitoring a BGP FS local-RIB through BMP is not deployed on the network node, the first server may send a traffic information report instruction to the network node, where the traffic information report instruction is used to instruct the network node to report the traffic matching information to the first server. In other words, after receiving the traffic information report instruction from the first server, the network node may obtain the traffic matching information of the BGP FS rule, and send the traffic matching information to the first server.

In an implementation, if the BGP FS rule is not implemented on the network node, there is necessarily no data traffic matching the BGP FS rule. In view of this, the first server may send the traffic information report instruction to the network node only when the first server receives the status from the network node and the status indicates that the BGP FS rule is implemented on the network node, to reduce data exchange between the first server and the network node.

According to a second aspect, the embodiments of this application provide a data processing method. Further, a first server may obtain a status of implementing a BGP FS rule on a network node, where the status indicates that the BGP FS rule is implemented on the network node, or the status indicates that the BGP FS rule is not implemented on the network node, and the first server stores the status. In this way, the first server can learn of the status of implementing the BGP FS rule on the network node. Correspondingly, the first server may further perform a corresponding operation based on the status if necessary, for example, perform corresponding adjustment, to effectively prevent attack traffic.

In an implementation, after storing the status of implementing the BGP FS rule on the network node, the first server may read the status of implementing the BGP FS rule on the network node, and perform another operation based on the status, for example, perform a first operation based on the status. Certainly, the first server may alternatively send the status to a second server, and the second server performs a first operation based on the status. In actual application, usually, the first operation is related to the BGP FS rule. Therefore, in the embodiments of this application, the second server may be a server that generates the BGP FS rule. It may be understood that, when the first server and the second server run on one device, the first server may perform the first operation based on the status. When the first server and the second server run on two devices, the first server may send the status to the second server, and the second server performs the first operation based on the status.

In an implementation of the embodiments of this application, to enable a network administrator to learn of the status of implementing the BGP FS rule on the network node, the first server or the second server may control a display device to display the status. In this way, the network administrator can determine the status of implementing the BGP FS rule on the network node by using content displayed on the display device. Further, the network administrator may perform corresponding adjustment based on the status.

In an implementation, to enable the BGP FS rule to be implemented on the network node to control attack traffic, if the status indicates that the BGP FS rule is not implemented on the network node, during specific implementation, the first server or the second server may perform the first operation based on the status for a purpose of enabling the BGP FS rule to be implemented on the network node. Further, if the first server or the second server determines that the BGP FS rule is not implemented on the network node due to a configuration parameter of the BGP FS rule, when performing the first operation, for example, the first server or the second server may modify the BGP FS rule and send a modified BGP FS rule to the network node during specific implementation, so that the network node implements the modified BGP FS rule. If the first server or the second server determines that the BGP FS rule is not implemented on the network node due to a configuration of the network node, when performing the first operation, for example, the first server or the second server may send a first configuration instruction to the network node during specific implementation. The first configuration instruction is used to reconfigure the network node. In this way, the network node can implement the BGP FS rule.

In an implementation, the BGP FS rule failing in BGP verification may be that the BGP FS rule carries an invalid parameter. Therefore, if the status indicates that the BGP FS rule fails in the BGP verification, the first server or the second server may modify the BGP FS rule, so that a modified BGP FS rule succeeds in the BGP verification. In this way, after the first server or the second server sends the modified BGP FS rule to the network node, the network node can implement the BGP FS rule. Further, the first server or the second server may determine the invalid parameter carried in the BGP FS rule, and modify the invalid parameter to a valid parameter.

In an implementation, if the status indicates that an effective interface carried in the BGP FS rule does not match an interface of the network node, the first server or the second server may modify the BGP FS rule. Further, the first server or the second server may modify the effective interface carried in the BGP FS rule to an interface matching the interface of the network node, and send a modified BGP FS rule to the network node. In this way, the network node can implement the BGP FS rule.

In an implementation, if the status may indicate that the BGP FS rule conflicts with a security protection policy, the first server or the second server may modify the BGP FS rule. Further, the first server or the second server may modify the BGP FS rule to a BGP FS rule that does not conflict with the security protection policy, and send a modified BGP FS rule to the network node. In this way, the network node can implement the BGP FS rule.

In an implementation, if the status may indicate that the BGP FS rule fails in the BGP FS verification, the BGP FS rule may fail in the BGP FS verification because the BGP FS rule does not meet a preset implementation condition. In this case, the first server or the second server may send a first configuration instruction to the network node. The first configuration instruction is used to instruct the network node to reconfigure a target parameter, and the target parameter is a parameter used to determine whether the BGP FS rule meets the preset implementation condition. In this way, the BGP FS rule can meet the preset implementation condition after the network node reconfigures the target parameter. Certainly, the first configuration instruction may alternatively be a configuration instruction used to configure the network node to cancel verifying whether the BGP FS rule meets the preset implementation condition. It may be understood that if the network node no longer verifies whether the BGP FS rule meets the preset implementation condition, the network node can implement the BGP FS rule.

In an implementation, the first server may further obtain traffic matching information of the BGP FS rule, and after obtaining the traffic matching information, the first server may further store the traffic matching information. In this way, the first server can learn of a traffic matching status of the BGP FS rule on the network node. Correspondingly, the first server may further perform a corresponding operation based on the status if necessary, for example, perform corresponding adjustment, to effectively prevent attack traffic.

In an implementation, the first server may further perform a second operation based on the traffic matching information, or the first server sends the traffic matching information to the second server, and the second server performs a second operation based on the traffic matching information.

In an implementation, to enable a network administrator to learn of the traffic matching status of the BGP FS rule on the network node, when performing the second operation based on the traffic matching information, for example, the first server or the second server may control the display device to display the traffic matching information during specific implementation. In this way, the network administrator can determine the traffic matching status of the BGP FS rule on the network node by using content displayed on the display device.

In an implementation, to enable the BGP FS rule to effectively control attack traffic, after obtaining the traffic matching information, the first server or the second server may further determine whether the traffic matching information meets a preset condition. The determining whether the traffic matching information meets the preset condition herein refers to determining whether an effect of traffic control performed according to the BGF FS rule meets an expectation.

In an implementation, in actual application, the BGP FS rule is formulated for abnormal traffic determined by analyzing historical data traffic passing through the network node. Therefore, the preset condition may also be determined based on the abnormal traffic, that is, obtained by analyzing the historical data traffic passing through the network node.

In an implementation, if it is determined that the obtained traffic matching information meets the preset condition, it indicates that the BGP FS rule can effectively prevent attack traffic. If it is determined that the obtained traffic matching information does not meet the preset condition, it indicates that the BGP FS rule cannot effectively prevent attack traffic. When the BGP FS rule cannot effectively prevent attack traffic, the first server or the second server may further determine a reason why the BGP FS rule cannot effectively prevent attack traffic, and perform corresponding adjustment, to effectively prevent attack traffic. Usually, there may be two reasons why the traffic matching information does not meet the preset condition. One is that the implementation of the BGP FS rule is interfered with by another traffic control policy. That is, the BGP FS rule is abnormally implemented on the network node. The other is a configuration of the BGP FS rule. For the first reason, for example, the first server or the second server may reconfigure the network node, so that the BGP FS rule is normally implemented on the network node. For the second reason, for example, the first server or the second server may modify the BGP FS rule, and send a modified BGP FS rule to the network node. In other words, the first server or the second server may further perform the second operation based on the traffic matching information in two implementations during specific implementation. In one implementation, when it is determined that the traffic matching information does not meet the preset condition, a second configuration instruction is sent to the network node based on the traffic matching information, where the second configuration instruction is used to reconfigure the network node. In the other implementation, when it is determined that the traffic matching information does not meet the preset condition, the BGP FS rule is modified based on the traffic matching information, and a modified BGP FS rule is sent to the network node.

In an implementation, the first server or the second server may first determine, based on the obtained status of implementing the BGP FS rule on the network node, whether a reason why the traffic matching information does not meet the preset condition is abnormal implementation of the BGP FS rule on the network node. Further, if the status of implementing the BGP FS rule on the network node obtained by the first server or the second server includes a priority of the BGP FS rule is lower than a priority of another traffic control policy, it indicates that the BGP FS rule is abnormally implemented on the network node. Correspondingly, the first server or the second server may send the second configuration instruction to the network node, where the second configuration instruction is used to configure the network node to cancel implementing the other traffic control policy, or is used to configure the network node to preferentially implement the BGP FS rule.

In an implementation, in actual application, if the other traffic control policy can effectively prevent attack traffic, even if the BGP FS rule is not implemented on the network node, the network system still normally works. In view of this, if the status of implementing the BGP FS rule on the network node obtained by the first server or the second server includes the priority of the BGP FS rule is lower than the priority of the other traffic control policy, the first server or the second server may further analyze data traffic passing through the network node, and determine whether abnormal traffic exists. If abnormal traffic exists, it indicates that the other traffic control policy does not effectively prevent attack traffic. In this case, the first server or the second server sends the second configuration instruction to the network node. If no abnormal traffic exists, it indicates that another traffic control policy can effectively prevent attack traffic. In this case, the first server or the second server may not send the second configuration instruction to the network node.

In an implementation, if the status of implementing the BGP FS rule on the network node obtained by the first server or the second server does not include the priority of the BGP FS rule is lower than the priority of the other traffic control policy, it indicates that the BGP FS rule is normally implemented. Correspondingly, the first server or the second server may determine that the traffic matching information does not meet the preset condition due to the configuration of the BGP FS rule. In this case, the first server or the second server may send a second configuration instruction to the network node, to reconfigure the network node, so that attack traffic can be effectively prevented after the BGP FS rule is implemented.

In an implementation, in actual application, if a combination of some parameters in the BGP FS rule causes the BGP FS rule to fail to take effect, further, attack traffic cannot be effectively prevented after the BGP FS rule is implemented on the network node. Therefore, the first server or the second server may analyze configuration parameters of the BGP FS rule, to determine whether the combination of some parameters that causes the BGP FS rule to fail to take effect exists in the BGP FS rule. If the combination of some parameters exists, the first server or the second server may modify the parameters, so that a modified BGP FS rule can take effect.

In an implementation, in actual application, if traffic to which the traffic control policy indicated by the BGP FS rule is directed is not actually attack traffic that needs to be prevented, attack traffic cannot be effectively prevented after the BGP FS rule is implemented. In this case, the first server or the second server may analyze the data traffic passing through the network node, and modify the BGP FS rule based on an analysis result. Further, the first server or the second server may determine a feature of the attack traffic by analyzing data traffic passing through the network node in a preset time period, and modify the BGP FS rule based on the feature of the attack traffic.

According to a third aspect, the embodiments of this application provide an information reporting apparatus. The apparatus includes an obtaining unit configured to obtain a status of implementing a BGP FS rule on a network node, where the status indicates that the BGP FS rule is implemented on the network node, or the status indicates that the BGP FS rule is not implemented on the network node, and a sending unit configured to send the status to a server.

In an implementation, the sending unit is further configured to add the status to an RM message, and send an RM message to which the status is added to the server.

In an implementation, if the status is that the BGP FS rule is implemented on the network node, the obtaining unit is further configured to obtain traffic matching information of the BGP FS rule, where the traffic matching information is related information of data traffic matching the BGP FS rule, and the sending unit is further configured to send the traffic matching information to the server.

In an implementation, the sending unit is further configured to add the traffic matching information to a status report SR message, and send an SR message to which the traffic matching information is added to the server.

In an implementation, the obtaining unit is further configured to, after receiving a status report instruction from the server, obtain the status of implementing the BGP FS rule on the network node.

In an implementation, the obtaining unit is further configured to obtain the traffic matching information of the BGP FS rule after receiving a traffic information report instruction from the server.

According to a fourth aspect, the embodiments of this application provide a data processing apparatus. The apparatus includes an obtaining unit configured to obtain a status of implementing a BGP FS rule on a network node, where the status indicates that the BGP FS rule is implemented on the network node, or the status indicates that the BGP FS rule is not implemented on the network node, and a storage unit configured to store the status.

In an implementation, the apparatus further includes an operation unit configured to perform a first operation based on the status, or a sending unit configured to send the status to a second server, so that the second server performs a first operation based on the status.

In an implementation, the operation unit is further configured to, if the status is that an effective interface carried in the BGP FS rule does not match an interface of the network node, modify the effective interface carried in the BGP FS rule to an interface matching the interface of the network node.

In an implementation, the operation unit is further configured to, if the status is that the BGP FS rule conflicts with a security protection policy, modify the BGP FS rule to a BGP FS rule that does not conflict with the security protection policy.

In an implementation, the operation unit is further configured to, if the status is that the BGP FS rule does not meet a preset implementation condition, send the first configuration instruction to the network node, where the first configuration instruction is used to instruct the network node to reconfigure a target parameter, so that the BGP FS rule meets the preset implementation condition, or the first configuration instruction is used to configure the network node to cancel verifying whether the BGP FS rule meets the preset implementation condition.

In an implementation, the obtaining unit is further configured to obtain traffic matching information of the BGP FS rule, where the traffic matching information is related information of data traffic matching the BGP FS rule, and storage unit is further configured to store the traffic matching information.

In an implementation, the operation unit is further configured to perform a second operation based on the traffic matching information, or the sending unit is further configured to send the traffic matching information to the second server, so that the second server performs a second operation based on the traffic matching information.

In an implementation, the operation unit is further configured to control a display device to display the traffic matching information.

In an implementation, the operation unit is further configured to determine whether the traffic matching information meets a preset condition, and if the traffic matching information does not meet the preset condition, modify the BGP FS rule based on the traffic matching information, and send a modified BGP FS rule to the network node.

In an implementation, the operation unit is further configured to send a second configuration instruction to the network node based on the traffic matching information, where the second configuration instruction is used to configure the network node.

In an implementation, the operation unit is further configured to, if the status includes a priority of the BGP FS rule is lower than a priority of another traffic control policy, send the second configuration instruction to the network node, where the second configuration instruction is used to configure the network node to cancel implementing the other traffic control policy, or is used to configure the network node to preferentially implement the BGP FS rule.

In an implementation, the apparatus further includes an analysis unit configured to, before the second configuration instruction is sent to the network node, analyze data traffic passing through the network node, to obtain an analysis result. The operation unit is further configured to, if the analysis result indicates that abnormal traffic exists in the data traffic passing through the network node, send the second configuration instruction to the network node.

In an implementation, the operation unit is further configured to modify the BGP FS rule if the status does not include the priority of the BGP FS rule is lower than a priority of another traffic control policy.

In an implementation, the operation unit is further configured to analyze configuration parameters of the BGP FS rule, determine whether a parameter combination that causes the BGP FS rule to fail to take effect exists, and modify the parameter combination if the parameter combination exists, so that a modified BGP FS rule takes effect.

In an implementation, the operation unit is further configured to analyze the data traffic passing through the network node, and modify the BGP FS rule based on an analysis result.

In an implementation, the sending unit is further configured to send a status report instruction to the network node, where the status report instruction is used to instruct the network node to report the status of implementing the BGP FS rule on the network node to the data processing apparatus.

In an implementation, the sending unit is further configured to send a traffic information report instruction to the network node, where the traffic information report instruction is used to instruct the network node to report the traffic matching information of the BGP FS rule to the data processing apparatus, and the traffic matching information is related information of data traffic matching the BGP FS rule.

In an implementation, the sending unit is further configured to, when the status received by the data processing apparatus is that the BGP FS rule is implemented on the network node, send the traffic information report instruction to the network node.

In an implementation, the BGP FS rule being implemented on the network node includes that the BGP FS rule is normally implemented, or the BGP FS rule is abnormally implemented.

In an implementation, the BGP FS rule being abnormally implemented includes that a priority of the BGP FS rule is lower than a priority of another traffic control policy run on the network node.

In an implementation, the BGP FS rule being not implemented on the network node includes that the BGP FS rule fails in BGP verification, and/or the BGP FS rule fails in BGP FS verification.

In an implementation, the BGP FS rule failing in the BGP verification includes that the BGP FS rule carries an invalid parameter.

In an implementation, the BGP FS rule failing in the BGP FS verification includes any one or more of the following. The BGP FS rule does not meet a preset implementation condition, an effective interface carried in the BGP FS rule does not match an interface of the network node, and the BGP FS rule conflicts with a security protection policy run on the network node.

According to a fifth aspect, the embodiments of this application provide a device, including a processor and a memory. The memory is configured to store instructions, and the processor is configured to execute the instructions in the memory, to perform the method according to any implementation of the first aspect or the method according to any implementation of the second aspect.

According to a sixth aspect, the embodiments of this application further provide a computer-readable storage medium, including instructions. When the instructions are run on a computer, the computer is enabled to perform the method according to any implementation of the first aspect or the method according to any implementation of the second aspect.

According to a seventh aspect, the embodiments of this application provide a computer program product including instructions. When the instructions are run on a computer, the computer is enabled to perform the method according to any implementation of the first aspect or the method according to any implementation of the second aspect.

BRIEF DESCRIPTION OF DRAWINGS

To describe the technical solutions in some of the embodiments of this application more clearly, the following briefly describes the accompanying drawings used in describing the embodiments. It is clearly that the accompanying drawings in the following description show some embodiments of this application, and a person of ordinary skill in the art may still derive other drawings from these accompanying drawings without creative efforts.

DESCRIPTION OF EMBODIMENTS

The embodiments of this application provide an information reporting method, to resolve a problem that a traffic attack cannot be effectively prevented according to a BGP FS rule in the conventional technology.

For ease of understanding the solution provided in the embodiments of this application, a BGP FS route is first briefly described.

The BGP FS route includes new BGP network layer reachability information and a new extended community attribute. By using the new network layer reachability information and the new extended community attribute, the BGP FS route may carry a corresponding BGP FS rule, and the BGP FS rule may also be considered as a traffic control policy. Further, the BGP FS rule may include a traffic matching condition and a corresponding traffic processing action after traffic matching. Currently, the traffic matching condition is carried in the BGP FS route as network layer reachability information, and the traffic processing action is carried in the BGP FS route as the extended community attribute.

The traffic matching condition may include 12 matching manners: matching based on a destination address, matching based on a source address, matching based on an Internet Protocol (IP) protocol number, matching based on a port number, matching based on a destination port number, matching based on a source port number, matching based on an Internet Control Message Protocol (ICMP) type, matching based on ICMP coding, matching based on a flag bit of a Transmission Control Protocol (TCP), matching based on a differentiated services code point (DSCP), and matching based on a slice type. The traffic processing action may include four types: traffic discarding, traffic limiting, modifying a DSCP value of a packet, and redirecting to a virtual private network (VPN).

Figure 1:
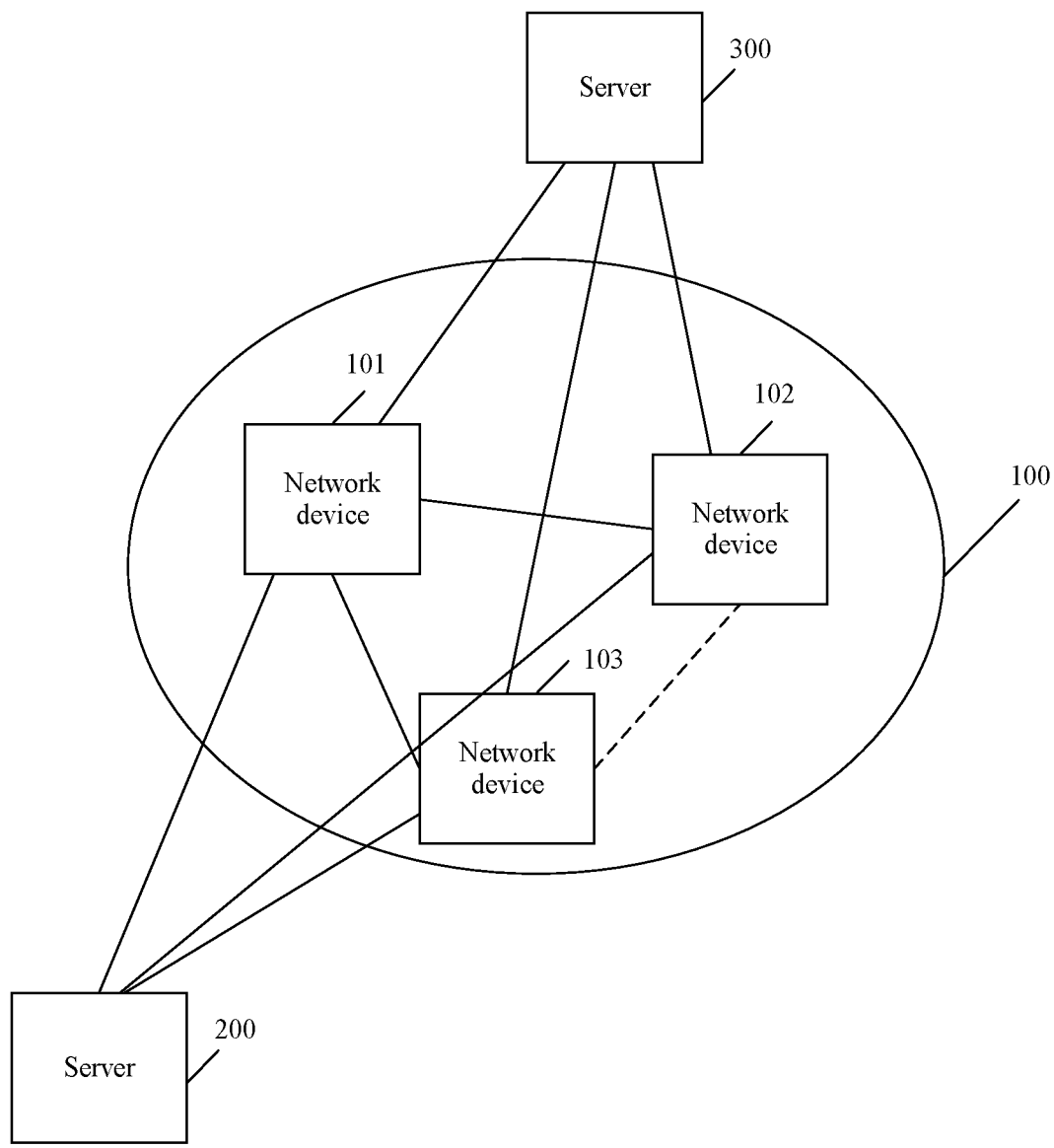
FIG. 1 is a schematic diagram of an example application scenario according to an embodiment of this application.

The following briefly describes an application scenario of the embodiments of this application with reference to the accompanying drawings. FIG. 1 is a schematic diagram of an example application scenario according to an embodiment of this application.

An autonomous system (AS) 100 includes a network device 101, a network device 102, and a network device 103. The network device 101, the network device 102, and the network device 103 may be routers, or may be switches. This is not further limited in the embodiments of this application. The network device 101 may be a provider edge (PE) device, and the network device 101 may be, for example, a network edge node of the AS 100.

To prevent attack traffic, a BGP FS peer relationship of a server 200, the network device 101, and the network device 102 may be set up, and a BGP FS peer relationship of the network device 101, the network device 102, and the network device 103 may be set up. In this way, for example, the server 200 may deploy a traffic sampling function on the network device 102 and the network device 103. For example, the server 200 may sample, by using NetStream, traffic passing through the network device 102 and the network device 103. The server 200 analyzes the sampled traffic, to determine whether abnormal traffic exists. If abnormal traffic exists, the server 200 generates a BGP FS route corresponding to the abnormal traffic. For example, after the server 200 analyzes the sampled traffic, if the server 200 determines that a large amount of attack traffic whose IP protocol number is 193 occurs on the network device 102, the server 200 generates a BGP FS route that instructs to intercept a data packet whose IP protocol number is 193. After generating the BGP FS route, the server 200 sends the BGP FS route to the network device 101 or the network device 102. After receiving the BGP FS route, the network device 101 or the network device 102 may parse the BGP FS route to determine a corresponding BGP FS rule. In an ideal case, the network device 101 may implement the BGP FS rule, to control abnormal traffic. It may be understood that, if the server 200 sends the BGP FS route to the network device 101, because the network device 101 is a network edge node of the AS, abnormal traffic may be controlled at a network ingress or a network egress of the AS 100.

It may be understood that, in actual application, after receiving the BGP FS route from the server 200, the network device 101 or the network device 102 may not implement the BGP FS rule as described in the ideal case. However, currently, no device monitors a status of implementing a BGP FS rule on a network node such as the network device 101. Correspondingly, the server 200 cannot evaluate an effect of preventing the attack traffic by the BGP FS rule based on the status of implementing the BGP FS rule on the network node, and cannot perform corresponding adjustment when necessary, and the attack traffic cannot be effectively prevented.

As shown in FIG. 1, FIG. 1 further includes a server 300 in addition to the server 200. The server 300 may be a BMP server. The BMP server may monitor a BGP running status of a network device in real time. The BGP running status includes establishing and terminating a peer relationship, updating of routing information, and the like. The network device may send a message to the BMP server according to the BMP protocol, to send the BGP running status of the network device to the BMP server. In the scenario shown in FIG. 1, the network device 101, the network device 102, and the network device 103 may report BGP running statuses of the network device 101, the network device 102, and the network device 103 to the server 300. The message sent by the network device to the BMP server according to the BMP protocol may be understood with reference to Table 1.

TABLE 1

| Message type | Message description and function |
|---|---|
| Initiation message | BMP initialization message. Notify the BMP server of vendor information and a version number |
| Peer up notification (PU) message | Report information about setting up a BGP peer connection to the BMP server |
| RM message | Send all routes received from a peer to the BMP server and report route addition or withdrawal to the BMP server |
| Peer down notification (PD) message | Report interruption of a BGP peer connection to the BMP server |
| Status report | Report statistics information of a running |

TABLE 1-continued

| Message type | Message description and function |
| --- | --- |
| (SR) message | status of a router to the BMP server |
| Termination message | Termination message. Notify the BMP server of a reason for terminating a BMP session |

In addition, for a network device on which a function of monitoring a BGP FS local-RIB through BMP is deployed, the network device may report a received BGP FS route to the BMP server. For example, if the function of monitoring a BGP FS local-RIB through BMP is deployed on the network device 101, after receiving a BGP FS route, the network device 101 reports the BGP FS route to the BMP server. However, the network device 101 only reports the BGP FS route to the BMP server. Therefore, even if the server 200 receives the BGP FS route from the network device 101, the server 200 cannot learn of a status of implementing a BGP FS rule on the network device 101. Consequently, the problem that the BGP FS cannot effectively prevent attack traffic still exists.

To resolve the problem, the embodiments of this application provide an information reporting method. The following describes the information reporting method with reference to the scenario shown in FIG. 1.

Before the information reporting method provided in the embodiments of this application is described, it should be further noted that FIG. 1 is merely shown for ease of understanding, and constitutes no limitation on the embodiments of this application. In actual application, a quantity of network devices included in an AS is not limited to 3 shown in FIG. 1. In addition, the server in the embodiments of this application may be a device, or may be a function module. This is not limited in the embodiments of this application. When the server in the embodiments of this application is a function module, the function module may be run on various devices. A device on which the function module is run is not limited in the embodiments of this application. The device may be a network node, a terminal device, or the like. Details are not provided herein. In other words, the server 200 and the server 300 may be two independent devices, or may be integrated into one device. Alternatively, the server 200 and the server 300 may be two function modules that are run on a same device, or may be two function modules that are run on two different devices.

Figure 2:
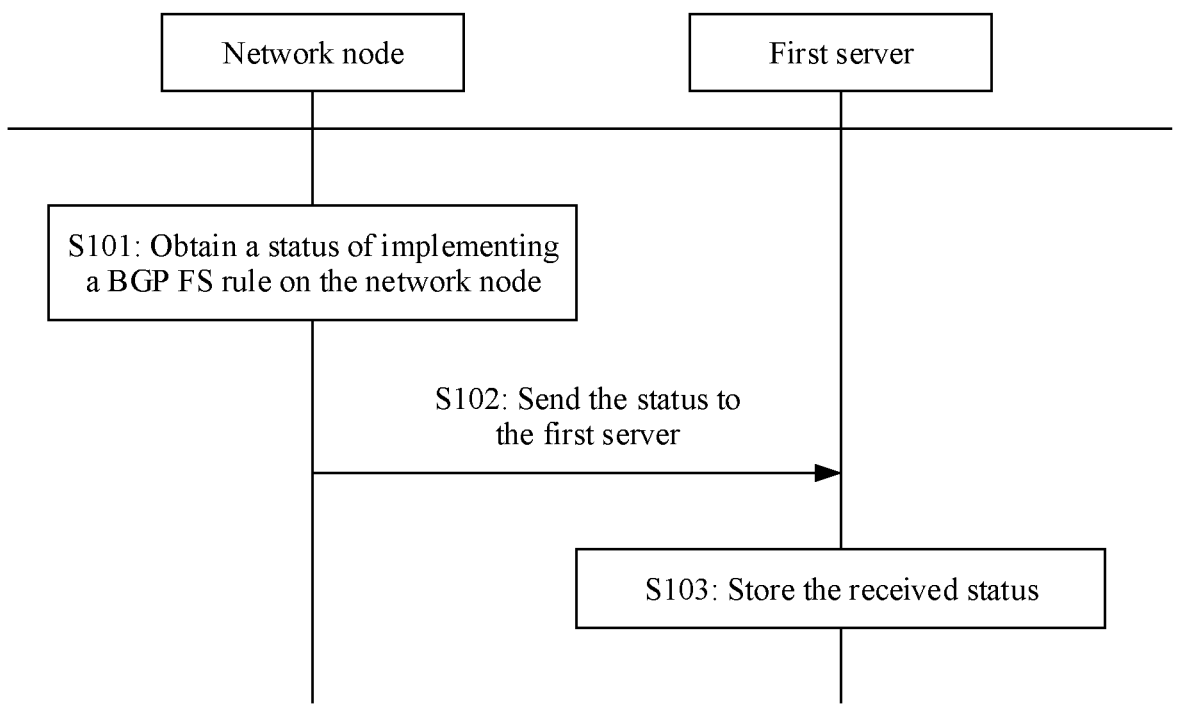
FIG. 2 is a signaling interaction diagram of an information reporting method according to an embodiment of this application.

FIG. 2 is a signaling interaction diagram of an information reporting method according to an embodiment of this application. The information reporting method provided in this embodiment of this application may be implemented by S101, S102, and S103.

S101: A network node obtains a status of implementing a BGP FS rule on the network node.

It should be noted that the network node herein may be, for example, the network device 101 shown in FIG. 1. The network node may receive a BGP FS route from a server, for example, the server 200 shown in FIG. 1, and the BGP FS route carries the BGP FS rule. After receiving the BGP FS route, the network node may parse the BGP FS route to determine the BGP FS rule carried in the BGP FS route. Further, the network node may implement the BGP FS rule.

In this embodiment of this application, the status of implementing the BGP FS rule on the network node is used to indicate that the BGP FS rule is implemented on the network node, or is used to indicate that the BGP FS rule is not implemented on the network node. In actual application, the network node records the status of implementing the BGP FS rule on the network node. Therefore, the network node may read a corresponding storage file, to obtain the status of implementing the BGP FS rule on the network node.

In this embodiment of this application, to enable the status to reflect more details of the status of implementing the BGP FS rule on the network node, in an implementation of this embodiment of this application, in actual application, the BGP FS rule being implemented on the network node may include at least two cases: normal implementation and abnormal implementation. The normal implementation means that the BGP FS rule has correctly participated in a BGP best path selection process, and the BGP FS rule is not interfered by another factor when being implemented. The abnormal implementation means that the BGP FS rule has correctly participated in a BGP best path selection process, but the BGP FS rule is interfered by another factor when being implemented. In view of this, the BGP FS rule being implemented on the network node may include that the BGP FS rule is normally implemented on the network node, or the BGP FS rule is abnormally implemented on the network node.

In actual application, other traffic control policies may be further run on the network node, for example, a traffic control policy indicated by an access control list (ACL), or a traffic control policy indicated by policy rule (i.e., policy-based routing (PBR)). If a priority of the BGP FS rule is lower than those of the other traffic control policies, these other traffic control policies interfere with the implementation of the BGP FS rule on the network node, because traffic passing through the network node is first processed by the other traffic control policies and then processed by the BGP FS rule. In other words, in an implementation of this embodiment of this application, the BGP FS rule being abnormally implemented on the network node may mean that the priority of the BGP FS rule is lower than those of the other traffic control policies.

Correspondingly, when the status is that the BGP FS rule is not implemented on the network node, to enable the status to further reflect a reason why the BGP FS rule is not implemented on the network node, in an implementation of this embodiment of this application, the status may further indicate a specific reason why the BGP FS rule is not implemented on the network node.

Further, in an implementation, after obtaining the BGP FS rule, the network node first verifies the BGP FS rule, and the network node can implement the BGP FS rule only after the BGP FS rule succeeds in the verification. The verification performed on the BGP FS rule may include BGP verification and/or BGP FS verification. If the BGP FS rule fails in the BGP verification, or the BGP FS rule fails in the BGP FS verification, the network node no longer implements the BGP FS rule. Therefore, in this embodiment of this application, the BGP FS rule being not implemented on the network node may include that the BGP FS rule fails in the BGP verification, and/or the BGP FS rule fails in the BGP FS verification.

It should be noted that, in actual application, a reason why the BGP FS rule fails in the BGP verification may usually be that the BGP FS rule carries an invalid parameter. The invalid parameter may be in at least two cases. One is that a parameter that cannot be processed by the network node exists in the BGP FS rule. For example, the BGP FS rule indicates to redirect to an IP version 6 (IPv6) next hop. However, the network node does not support redirection to the IPv6 next hop. The other is that an invalid autonomous system (AS) path exists in the BGP FS rule. For example, an AS identifier carried in the BGP FS rule is equal to an AS identifier corresponding to the network node. For another example, an AS identifier carried in the BGP FS rule is not equal to an AS identifier corresponding to a second server.

For the BGP FS rule failing in the BGP FS verification, it should be noted that, in an implementation, usually, the network node may include one or more interfaces, and the BGP FS rule usually carries an effective interface of the BGP FS rule. If the effective interface carried in the BGP FS rule does not match the interface of the network node, the BGP FS rule cannot be implemented on the network node. In this case, the BGP FS rule being not implemented on the network node may be that the effective interface carried in the BGP FS rule does not match the interface of the network node.

It should be noted that the effective interface herein may be one interface, or may be a plurality of interfaces. This is not limited in this embodiment of this application. When there is a plurality of effective interface, for example, the BGP FS rule may carry identifiers of the plurality of interfaces.

In an implementation, in actual application, a corresponding security protection policy may be further configured on the network node. If the BGP FS rule conflicts with the security protection policy, the BGP FS rule cannot be implemented on the network node. For example, the security protection policy on the network node indicates to forbid traffic limiting on a packet with a specified IP prefix or a specified protocol, and the BGP FS rule is to perform traffic limiting on the packet with the specified IP address. As a result, the BGP FS rule cannot be implemented on the network node. In this case, the BGP FS rule being not implemented on the network node may be that the BGP FS rule conflicts with the security protection policy.

In addition, usually, a preset implementation condition may be further set on the network node for the BGP FS rule, and the network node can implement the BGP FS rule only when the BGP FS rule meets the preset implementation condition. With respect to the preset implementation condition, it should be noted that, in an implementation, not all devices have a requirement for implementing the BGP FS rule in actual application. For example, a route reflector is only configured to transfer a route, and does not implement the BGP FS rule. Therefore, usually, the preset implementation condition may include that the network node is not allowed to implement the BGP FS rule. It may be understood that if the network node is configured to not allow to implement the BGP FS rule, the status of implementing the BGP FS rule on the network node is definitely that the BGP FS rule is not implemented. In another implementation, in actual application, to control resources occupied by the network node to implement the BGP FS rule, the network node may set an upper limit of a quantity of to-be-implemented BGP FS rules. When a quantity of received BGP FS rules exceeds the upper limit of the quantity, it is determined that the BGP FS rule does not meet the preset implementation condition. Alternatively, the network device may set an upper limit of a quantity of traffic matching conditions. When determining that traffic matching conditions indicated by the BGP FS rule exceed the upper limit of the quantity of traffic matching conditions, the network node determines that the BGP FS rule does not meet the preset implementation condition. Alternatively, the network device may set an upper limit of a quantity of traffic processing actions, and when determining that traffic processing actions indicated by the BGP FS rule exceed the upper limit of the quantity of traffic processing actions, the network node determines that the BGP FS rule does not meet the preset implementation condition. Alternatively, the network node allocates a specific amount of memory to the BGP FS rule, and when determining that available memory corresponding to the BGP FS rule is insufficient, the network node determines that the BGP FS rule does not meet the preset implementation condition.

S102: The network node sends the status to a first server.

After obtaining the status, the network node may send the status to the first server. After the network node sends the status to the first server, the first server may determine, based on the status, the status of implementing the BGP FS rule on the network node. It should be noted that the first server herein may be the server 200 shown in FIG. 1, or may be the server 300 shown in FIG. 1. This is not limited in this embodiment of this application. However, in actual application, a BMP server usually monitors a BGP running status of the network device in real time. Therefore, in an optional solution, the first server may be a BMP server, namely, the server 300 shown in FIG. 1. In the following description of this embodiment of this application, unless otherwise specified, the first server corresponds to the server 300 shown in FIG. 1.

As described above, if a function of monitoring a BGP FS local-RIB through BMP is deployed on the network node, after receiving a BGP FS route, the network node reports the BGP FS route to the BMP server. In addition, the network node may report the received BGP FS route to the BMP server by using an RM message shown in Table 1. In view of this, in an implementation of this embodiment of this application, the network node may use the RM message as a carrier, and send an RM message including the status of implementing the BGP FS rule on the network node to a first server. Further, the network node may add the status of implementing the BGP FS rule on the network node to the RM message, and then send the RM message to which the status is added to the first server. In this embodiment of this application, the RM message may be extended to carry the status in an extension field of the RM message. For example, the status may be carried in an extended type-length-value (TLV) field.

In addition, when the function of monitoring a BGP FS local-RIB through BMP is not deployed on the network node, because the function of monitoring a BGP FS local-RIB through BMP is not deployed on the network node, the network node does not send the BGP FS route to the first server. Correspondingly, the status of implementing the BGP FS rule on the network node cannot be sent to the first server through the RM message. In this case, the first server may send a status report instruction to the network node. The status report instruction is used to instruct the network node to report the status of implementing the BGP FS rule on the network node to the first server. In other words, after receiving the status report instruction from the first server, the network node may perform S101 and S102.

It should be noted that a frame structure of the status report instruction is not further limited in this embodiment of this application. In an example, the status report instruction may carry an address family identifier (AFI) and a AFI (SAFI). For each BGP FS rule matching the AFI and the SAFI, the network node may report a status of implementing each BGP FS rule on the network node to the first server. In another example, the status report instruction carries an identifier of a BGP FS rule, and the network node may report, to the first server, a status of implementing the BGP FS rule corresponding to the identifier on the network node. Certainly, the status report instruction may further include other fields, which are not described one by one herein.

In this embodiment of this application, after receiving the status report instruction, the network node may periodically perform S101 and S102, or certainly may perform S101 and S102 only once. This is not limited in this embodiment of this application. In a solution in which the network node periodically performs S101 and S102, in an implementation of this embodiment of this application, the first server may further send a status report stop instruction to the network node, to instruct the network node to no longer report the status of implementing the BGP FS rule on the network node. For example, the first server determines, based on the status of implementing the BGP FS rule on the network node reported by the network node, that the BGP FS rule is normally implemented in a period of time, and therefore does not monitor the status of implementing the BGP FS rule on the network node. In this case, the first server may send a status report stop instruction to the network node.

In this embodiment of this application, the status report instruction and the status report stop instruction may use a same frame structure, and a value of a field is used to distinguish between the status report instruction and the status report stop instruction. For example, when a value of a first field in the first instruction delivered by the first server is 1, the first instruction is the status report instruction, and when the value of the first field in the first instruction is 0, the first instruction is the status report stop instruction.

S103: The first server stores the received status.

In this embodiment of this application, after the first server receives the status of implementing the BGP FS rule on the network node, the first server may store the status. Further, the first server may store the status in a memory. When necessary, the first server may read, from the memory, the status of implementing the BGP FS rule on the network node, and perform another operation based on the status, for example, perform a first operation based on the status. Certainly, the first server may alternatively send the status to the second server, and the second server performs a first operation based on the status. It should be noted that in actual application, usually, the first operation is related to the BGP FS rule. Therefore, in this embodiment of this application, the second server may be a server that generates the BGP FS rule, for example, the server 200 shown in FIG. 1. As described above, the first server and the second server may run on a same device, or may run on different devices. It may be understood that, when the first server and the second server run on one device, the first server may perform the first operation based on the status. When the first server and the second server run on two devices, the first server may send the status to the second server, and the second server performs the first operation based on the status. A specific implementation in which the first server performs the first operation based on the status is the same as a specific implementation in which the second server performs the first operation based on the status. The following uses an example in which the first server performs the first operation based on the status for description.

In an implementation of this embodiment of this application, to enable a network administrator to learn of the status of implementing the BGP FS rule on the network node, the first server may control a display device to display the status. In this way, the network administrator can determine the status of implementing the BGP FS rule on the network node by using content displayed on the display device. Further, the network administrator may perform corresponding adjustment based on the status. The display device herein may be a display. The display may be a display of the first server, or may be a display of another device. This is not limited in this embodiment of this application.

In another implementation of this embodiment of this application, to enable the BGP FS rule to be implemented on the network node to control attack traffic, if the status indicates that the BGP FS rule is not implemented on the network node, during specific implementation, the first server may perform the first operation based on the status for a purpose of enabling the BGP FS rule to be implemented on the network node. Further, it can be learned from the description of the status of implementing the BGP FS rule on the network node in S101 that the BGP FS rule is not implemented on the network node due to a configuration parameter of the BGP FS rule, or a configuration of the network node. Therefore, in this embodiment of this application, the first server may determine, based on the status of implementing the BGP FS rule on the network node, a reason why the BGP FS rule is not implemented on the network node, and further perform the first operation based on the determined reason.

Further, if the first server determines that the BGP FS rule is not implemented on the network node due to a configuration parameter of the BGP FS rule, when performing the first operation, for example, the first server may modify the BGP FS rule and send a modified BGP FS rule to the network node during specific implementation, so that the network node implements the modified BGP FS rule. If the first server determines that the BGP FS rule is not implemented on the network node due to a configuration of the network node, when performing the first operation, for example, the first server may send a first configuration instruction to the network node during specific implementation. The first configuration instruction is used to reconfigure the network node. In this way, the network node can implement the BGP FS rule.

The following separately describes specific implementations in which the first server modifies the BGP FS rule based on the status and the first server sends the first configuration instruction to the network node.

A specific implementation in which "the first server modifies the BGP FS rule based on the status" is first described.

It can be learned from the description of the status of implementing the BGP FS rule on the network node in S101 that the status may indicate that the BGP FS rule fails in the BGP verification. However, the BGP FS rule failing in the BGP verification may include that the BGP FS rule carries an invalid parameter. In this case, the first server may modify the BGP FS rule, so that the modified BGP FS rule succeeds in the BGP verification. In this way, after the first server sends the modified BGP FS rule to the network node, the network node can implement the BGP FS rule. Further, the first server may determine the invalid parameter carried in the BGP FS rule, and modify the invalid parameter to a valid parameter. For example, the first server may modify a parameter that is in the BGP FS rule and that cannot be processed by the network node to a parameter that can be processed by the network node, and send the modified BGP FS rule to the network node. For another example, the first server may modify an invalid AS path in the BGP FS rule to a valid AS path, and send the modified BGP FS rule to the network node.

It can be learned from the description of the status of implementing the BGP FS rule on the network node in S101 that the status may indicate that the effective interface carried in the BGP FS rule does not match the interface of the network node. In this case, because the effective interface carried in the BGP FS rule does not match the interface of the network node, the BGP FS rule cannot be implemented on the network node. Therefore, the first server may modify the BGP FS rule. Further, the first server may modify the effective interface carried in the BGP FS rule to an interface matching the interface of the network node, and send the modified BGP FS rule to the network node. In this way, the network node can implement the BGP FS rule.

It can be learned from the description of the status of implementing the BGP FS rule on the network node in S101 that the status may indicate that the BGP FS rule conflicts with the security protection policy. In this case, the first server may modify the BGP FS rule. Further, the first server may modify the BGP FS rule to a BGP FS rule that does not conflict with the security protection policy, and send the modified BGP FS rule to the network node. In this way, the network node can implement the BGP FS rule. For example, the security protection policy on the network node indicates to forbid traffic limiting on a packet with a first IP prefix, and the BGP FS rule indicates to perform traffic limiting on the packet with the first IP prefix and a second IP prefix. In this case, the first server may delete, from the BGP FS rule, a traffic control policy for performing traffic limiting on the packet with the first IP prefix.

The following describes a specific implementation in which "the first server sends the first configuration instruction to the network node based on the status".

It can be learned from the description of the status of implementing the BGP FS rule on the network node in S101 that the status may indicate that the BGP FS rule fails in the BGP FS verification. A reason why the BGP FS rule fails in the BGP FS verification may be that the BGP FS rule does not conform to a verification rule used by the network node to verify the BGP FS rule, that is, the BGP FS rule does not meet the preset implementation condition. In this case, the first server may send the first configuration instruction to the network node. The first configuration instruction is used to instruct the network node to reconfigure a target parameter, and the target parameter is a parameter used to determine whether the BGP FS rule meets the preset implementation condition. In this way, the BGP FS rule can meet the preset implementation condition after the network node reconfigures the target parameter. For example, the target parameter may be a parameter that enables the network node to be configured to implement the BGP FS rule, the upper limit of the quantity of BGP FS rules described above, the upper limit of the quantity of traffic matching conditions described above, the upper limit of the quantity of traffic processing actions described above, or a memory size allocated by the network node to the BGP FS rule. Certainly, the first configuration instruction may alternatively be a configuration instruction used to configure the network node to cancel verifying whether the BGP FS rule meets the preset implementation condition. It may be understood that if the network node no longer verifies whether the BGP FS rule meets the preset implementation condition, the network node can implement the BGP FS rule.

It can be learned from the foregoing description that according to the solution provided in this embodiment of this application, the first server may learn of the status of implementing the BGP FS rule on the network node. Correspondingly, the first server may store the status, and perform the first operation based on the status when necessary, for example, modify the BGP FS rule, or reconfigure the network node, so that the BGP FS rule can be implemented on the network node, to effectively prevent attack traffic.

In an implementation of this embodiment of this application, when the BGF FS rule is implemented on the network node, in order to further evaluate a traffic control effect of the BGP FS rule, the network node may further obtain traffic matching information of the BGP FS rule, and send the traffic matching information to the first server. The traffic matching information is related information of data traffic matching the BGP FS rule. The traffic matching information is not limited in this embodiment of this application. For example, the traffic matching information may be a quantity of packets matching the BGP FS rule, or may be a quantity of bytes occupied by packets matching the BGP FS rule.

As described above, if the function of monitoring a BGP FS local-RIB through BMP is deployed on the network node, after receiving a BGP FS route, the network node reports the BGP FS route to the BMP server. It can be learned from Table 1 that a type of message sent by the network node to the BMP server is an SR message. The SR message carries statistics information, and the traffic matching information may also be considered as statistics information. In view of this, in this embodiment of this application, the traffic matching information may be sent to the first server by using the existing SR message as a carrier. In other words, in an implementation of this embodiment of this application, the network node may add the traffic matching information of the BGP FS rule to the SR message, and then send an SR message to which the traffic matching information is added to the first server. Further, the network node may use an extension field of the SR message to carry the traffic matching information. For example, the traffic matching information may be carried in an extended TLV field.

In addition, when the function of monitoring a BGP FS local-RIB through BMP is not deployed on the network node, the first server may send a traffic information report instruction to the network node, where the traffic information report instruction is used to instruct the network node to report the traffic matching information to the first server. In other words, after receiving the traffic information report instruction from the first server, the network node may obtain the traffic matching information of the BGP FS rule, and send the traffic matching information to the first server. It should be noted that a frame structure of the traffic information report instruction is not limited in this embodiment of this application. Similar to the frame structure of the status report instruction, in an example, the traffic information report instruction may carry an AFI and a SAFI. In another example, the traffic information report instruction carries an identifier of the BGP FS rule. Certainly, the traffic information report instruction may further include other fields, which are not described one by one herein.

In actual application, if the BGP FS rule is not implemented on the network node, there is necessarily no data traffic matching the BGP FS rule. In view of this, in an implementation of this embodiment of this application, the first server may send the traffic information report instruction to the network node only when the first server receives the status from the network node and the status indicates that the BGP FS rule is implemented on the network node, to reduce data exchange between the first server and the network node.

In this embodiment of this application, after receiving the traffic information report instruction, the network node may periodically obtain the traffic matching information of the BGP FS rule, and send the traffic matching information to the first server. Certainly, the network node may alternatively obtain the traffic matching information of the BGP FS rule and send the traffic matching information to the first server only once. This is not limited in this embodiment of this application. For the step of periodically obtaining, by the network node, the traffic matching information of the BGP FS rule, and sending the traffic matching information to the first server, in an implementation of this embodiment of this application, the first server may further send a traffic information report stop instruction to the network node. The instruction is used to instruct the network node no longer report the traffic matching information of the BGP FS rule. For example, if the first server determines, based on the traffic matching information reported by the network node, that the BGP FS rule successfully intercepts attack traffic in a period of time, and therefore the first server no longer monitors a traffic matching status of the BGP FS rule, the first server may send the traffic information report stop instruction to the network node.

In this embodiment of this application, the traffic information report instruction and the traffic information report stop instruction may use a same frame structure, and a value of a field is used to distinguish between the traffic information report instruction and the traffic information report stop instruction. For example, when a value of a second field in the second instruction delivered by the first server is 1, the second instruction is the traffic information report instruction, and when the value of the second field in the second instruction is 0, the second instruction is the traffic information report stop instruction.

After receiving the traffic matching information from the network node, the first server may store the traffic matching information, and may further perform a second operation based on the traffic matching information. Alternatively, the first server sends the traffic matching information to the second server, and the second server performs a second operation based on the traffic matching information.

A specific implementation in which the first server performs the second operation based on the traffic matching information is the same as a specific implementation in which the second server performs the second operation based on the traffic matching information. The following uses an example in which the first server performs the second operation based on the traffic matching information for description.

In an implementation of this embodiment of this application, to enable a network administrator to learn of the traffic matching status of the BGP FS rule on the network node, the first server may control the display device to display the traffic matching information. In this way, the network administrator can determine the traffic matching status of the BGP FS rule on the network node by using content displayed on the display device. Further, the network administrator may perform corresponding adjustment based on the traffic matching information. The display device herein may be a display. The display may be a display of the first server, or may be a display of another device. This is not limited in this embodiment of this application.

In another implementation of this embodiment of this application, to enable the BGP FS rule to effectively control attack traffic, after obtaining the traffic matching information, the first server may further determine whether the traffic matching information meets a preset condition. The determining whether the traffic matching information meets the preset condition herein refers to determining whether an effect of traffic control performed according to the BGF FS rule meets an expectation. The preset condition is not limited in this embodiment of this application. In actual application, the BGP FS rule is formulated for abnormal traffic determined by analyzing historical data traffic passing through the network node. Therefore, in an implementation of this embodiment of this application, the preset condition may also be determined based on the abnormal traffic, that is, obtained by analyzing the historical data traffic passing through the network node. For example, if it is found, by analyzing the historical data traffic passing through the network node, that attack traffic that passes through the network node in a unit time is M, the traffic matching information meets the preset condition. For example, the preset condition is that data traffic matching a traffic control policy indicated by the BGP FS rule in a unit time may be greater than or equal to M×k, where k is a proportional coefficient. Certainly, the description is provided herein only for ease of understanding, and does not constitute a limitation on this embodiment of this application.

It may be understood that if the first server determines that the obtained traffic matching information meets the preset condition, it indicates that the BGP FS rule can effectively prevent attack traffic. If the first server determines that the obtained traffic matching information does not meet the preset condition, it indicates that the BGP FS rule cannot effectively prevent attack traffic. When the BGP FS rule cannot effectively prevent attack traffic, the first server may further determine a reason why the BGP FS rule cannot effectively prevent attack traffic, and perform corresponding adjustment, to effectively prevent attack traffic.

In actual application, there may be two reasons why the traffic matching information does not meet the preset condition. One is that the implementation of the BGP FS rule is interfered with by another traffic control policy. That is, the BGP FS rule is abnormally implemented on the network node described above. The other is a configuration of the BGP FS rule. For the first reason, in this embodiment of this application, for example, the first server may reconfigure the network node, so that the BGP FS rule is normally implemented on the network node. For the second reason, in this embodiment of this application, for example, the first server may modify the BGP FS rule, and send a modified BGP FS rule to the network node. In other words, in this embodiment of this application, the first server may further perform the second operation based on the traffic matching information in two implementations during specific implementation. In one implementation, when it is determined that the traffic matching information does not meet the preset condition, a second configuration instruction is sent to the network node based on the traffic matching information, where the second configuration instruction is used to reconfigure the network node. In the other implementation, when it is determined that the traffic matching information does not meet the preset condition, the BGP FS rule is modified based on the traffic matching information, and a modified BGP FS rule is sent to the network node. The following separately describes the two implementations.

Further, the first server may first determine, based on the obtained status of implementing the BGP FS rule on the network node, whether a reason why the traffic matching information does not meet the preset condition is abnormal implementation of the BGP FS rule on the network node. Further, if the status of implementing the BGP FS rule on the network node obtained by the first server includes a priority of the BGP FS rule is lower than a priority of another traffic control policy, it indicates that the BGP FS rule is abnormally implemented on the network node. Correspondingly, the first server may send the second configuration instruction to the network node, where the second configuration instruction is used to configure the network node to cancel implementing the other traffic control policy, or is used to configure the network node to preferentially implement the BGP FS rule. For the other traffic control policy, refer to the foregoing description of implementation status information. Details are not described herein again.

It should be noted that, in actual application, if the other traffic control policy can effectively prevent attack traffic, even if the BGP FS rule is not implemented on the network node, the network system still normally works. In view of this, in an implementation of this embodiment of this application, if the status of implementing the BGP FS rule on the network node obtained by the first server includes the priority of the BGP FS rule is lower than the priority of the other traffic control policy, the first server may further analyze data traffic passing through the network node, and determine whether abnormal traffic exists. If abnormal traffic exists, it indicates that the other traffic control policy does not effectively prevent attack traffic. In this case, the first server sends the second configuration instruction to the network node. If no abnormal traffic exists, it indicates that another traffic control policy can effectively prevent attack traffic. In this case, the first server may not send the second configuration instruction to the network node.

If the status of implementing the BGP FS rule on the network node obtained by the first server does not include the priority of the BGP FS rule is lower than the priority of the other traffic control policy, it indicates that the BGP FS rule is normally implemented. Correspondingly, the first server may determine that the traffic matching information does not meet the preset condition due to the configuration of the BGP FS rule. In actual application, if a combination of some parameters in the BGP FS rule causes the BGP FS rule to fail to take effect, further, attack traffic cannot be effectively prevented after the BGP FS rule is implemented on the network node. For example, a parameter 1 needs to match packets with less than 1000 bytes, and a parameter 2 needs to match packets with more than 2000 bytes. After the two parameters are combined, the BGP FS rule cannot take effect. For another example, a traffic processing action corresponding to a parameter 3 is redirected to a VPN instance, and a traffic processing action corresponding to the parameter 4 is redirected to a specific IP address. After the two parameters are combined, the BGP FS rule cannot take effect. In view of this, in an implementation of this embodiment of this application, the first server may analyze configuration parameters of the BGP FS rule, to determine whether the combination of some parameters that causes the BGP FS rule to fail to take effect exists in the BGP FS rule. If the combination of some parameters exists, the first server may modify the parameters, so that a modified BGP FS rule can take effect. In addition, if traffic to which the traffic control policy indicated by the BGP FS rule is directed is not actually attack traffic that needs to be prevented, attack traffic cannot be effectively prevented after the BGP FS rule is implemented. For example, a destination address network segment of the attack traffic is 10.1.1.0/24, but a destination address network segment in a matching condition in the BGP FS rule is 20.1.1.0/24. In this case, in an implementation of this embodiment of this application, the first server may analyze the data traffic passing through the network node, and modify the BGP FS rule based on an analysis result. Further, the first server may determine a feature of the attack traffic by analyzing data traffic passing through the network node in a preset time period, and modify the BGP FS rule based on the feature of the attack traffic. For example, after analyzing data traffic passing through the network node in a first time period, the first server determines that there is a large amount of attack traffic whose destination address is in the network segment 10.1.1.0/24, and the destination address in the matching condition in the BGP FS rule is in the network segment 20.1.1.0/24. In this case, the first server modifies the network segment in which the destination address in the matching condition in the BGP FS rule is located to 10.1.1.0/24. The preset time period is not limited in this embodiment of this application.

Figure 3:
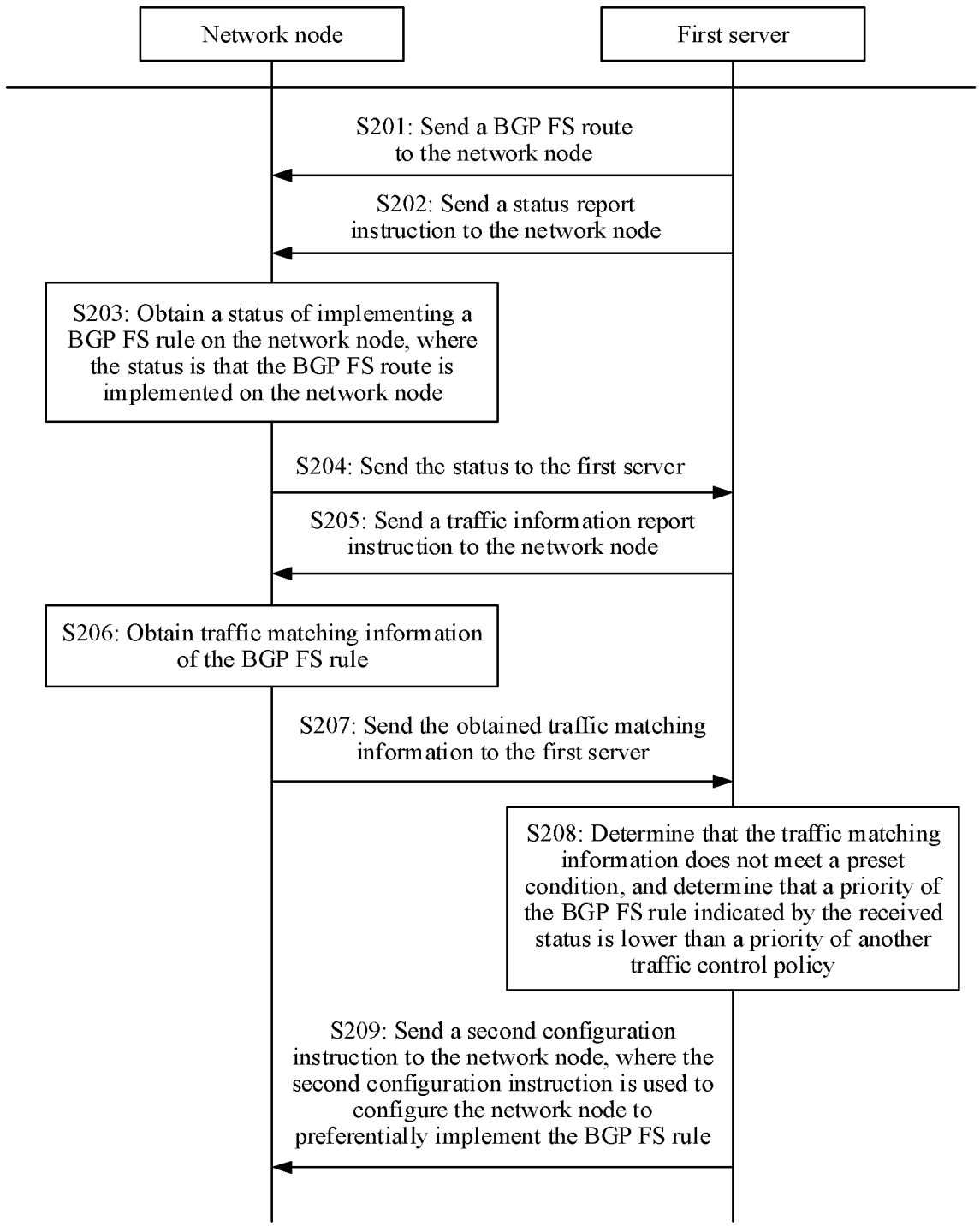
FIG. 3 is a signaling interaction diagram of an information reporting method according to an embodiment of this application.

The foregoing describes the information reporting method provided in the embodiments of this application, and the following describes the information reporting method provided in the embodiments of this application with reference to accompanying drawings. FIG. 3 is a signaling interaction diagram of an information reporting method according to an embodiment of this application. FIG. 3 shows signaling interaction between a network node and a first server. It should be noted that, in the scenario shown in FIG. 3, the second server and the first server described above are integrated into one device. FIG. 3 shows some steps for ease of understanding, but this does not constitute a limitation on this embodiment of this application. The information reporting method shown in FIG. 3 may be implemented by S201 to S209.

S201: The first server sends a BGP FS route to the network node.

S202: The first server sends a status report instruction to the network node.

S203: The network node obtains a status of implementing a BGP FS rule on the network node, where the status is that the BGP FS rule is implemented on the network node.

It may be understood that the BGP FS route received by the network node carries the BGP FS rule.

S204: The network node sends the obtained status to the first server.

S205: The first server sends a traffic information report instruction to the network node.

S206: The network node obtains traffic matching information of the BGP FS rule.

S207: The network node sends the obtained traffic matching information to the first server.

S208: The first server determines that the traffic matching information does not meet a preset condition, and determines that a priority of the BGP FS rule indicated by the received status is lower than a priority of another traffic control policy.

S209: The first server sends a second configuration instruction to the network node, where the second configuration instruction is used to configure the network node to preferentially implement the BGP FS rule.

According to the information reporting method provided in the foregoing embodiments, the embodiments of this application further provide an information reporting apparatus. The information reporting apparatus is configured to perform the information reporting method performed by the network node in the foregoing embodiments, for example, perform the steps performed by the network node shown in FIG. 2 and FIG. 3. The information reporting apparatus is described below with reference to accompanying drawings.

Figure 4:
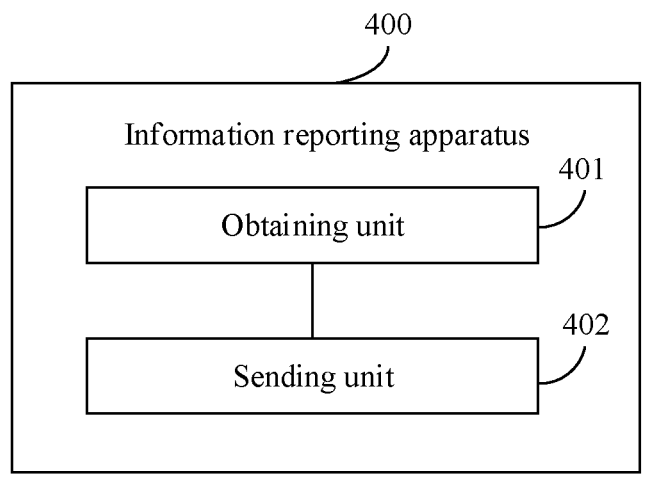
FIG. 4 is a schematic diagram of a structure of an information reporting apparatus according to an embodiment of this application.

FIG. 4 is a schematic diagram of a structure of the information reporting apparatus according to an embodiment of this application. An information reporting apparatus 400 shown in FIG. 4 may include, for example, an obtaining unit 401 and a sending unit 402.

The obtaining unit 401 is configured to obtain a status of implementing a BGP FS rule on a network node, where the status indicates that the BGP FS rule is implemented on the network node, or the status indicates that the BGP FS rule is not implemented on the network node.

The sending unit 402 is configured to send the status to a server.

In an implementation, the sending unit 402 is further configured to add the status to an RM message, and send an RM message to which the status is added to the server.

In an implementation, the BGP FS rule being implemented on the network node includes that the BGP FS rule is normally implemented, or the BGP FS rule is abnormally implemented.

In an implementation, the BGP FS rule being abnormally implemented includes the following.

A priority of the BGP FS rule is lower than a priority of another traffic control policy run on the network node.

In an implementation, the BGP FS rule being not implemented on the network node includes the following.

The BGP FS rule fails in BGP verification, and/or the BGP FS rule fails in BGP FS verification.

In an implementation, the BGP FS rule failing in the BGP verification includes the following.

The BGP FS rule carries an invalid parameter.

In an implementation, the BGP FS rule failing in the BGP FS verification includes any one or more of the following.

The BGP FS rule does not meet a preset implementation condition, an effective interface carried in the BGP FS rule does not match an interface of the network node, and the BGP FS rule conflicts with a security protection policy run on the network node.

In an implementation, if the status is that the BGP FS rule is implemented on the network node, the obtaining unit 401 is further configured to obtain traffic matching information of the BGP FS rule, where the traffic matching information is related information of data traffic matching the BGP FS rule.

The sending unit 402 is further configured to send the traffic matching information to the server.

In an implementation, the sending unit 402 is further configured to add the traffic matching information to a status report SR message, and send an SR message to which the traffic matching information is added to the server.

In an implementation, the obtaining unit 401 is further configured to, after receiving a status report instruction from the server, obtain the status of implementing the BGP FS rule on the network node.

In an implementation, the obtaining unit 401 is further configured to obtain the traffic matching information of the BGP FS rule after receiving a traffic information report instruction from the server.

The apparatus 400 is an apparatus corresponding to the information reporting method performed by the network node in the foregoing method embodiments, and specific implementation of each unit of the apparatus 400 has a same concept as that of the foregoing method embodiments. Therefore, for specific implementation of each unit of the apparatus 400, refer to the description of the information reporting method performed by the network node in the foregoing method embodiments. Details are not described herein again.

According to the data processing method provided in the foregoing embodiments, the embodiments of this application further provide a data processing apparatus. The data processing apparatus is configured to perform the data processing method performed by the first server in the foregoing embodiments, for example, perform steps performed by the first server shown in FIG. 2 and FIG. 3. The data processing apparatus is described below with reference to accompanying drawings.

Figure 5:
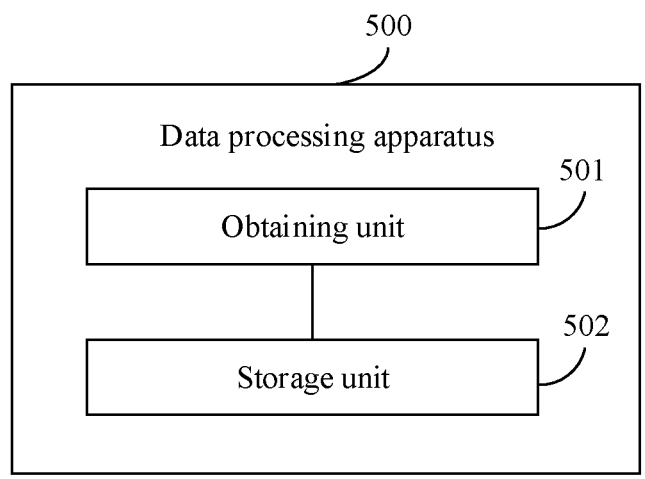
FIG. 5 is a schematic diagram of a structure of a data processing apparatus according to an embodiment of this application.

FIG. 5 is a schematic diagram of a structure of the data processing apparatus according to an embodiment of this application. A data processing apparatus 500 shown in FIG. 5 may include, for example, an obtaining unit 501 and a storage unit 502.

The obtaining unit 501 is configured to obtain a status of implementing a BGP FS rule on a network node, where the status indicates that the BGP FS rule is implemented on the network node, or the status indicates that the BGP FS rule is not implemented on the network node.

The storage unit 502 is configured to store the status.

In an implementation, the BGP FS rule being implemented on the network node includes that the BGP FS rule is normally implemented, or the BGP FS rule is abnormally implemented.

In an implementation, the BGP FS rule being abnormally implemented includes the following.

A priority of the BGP FS rule is lower than a priority of another traffic control policy run on the network node.

In an implementation, the BGP FS rule being not implemented on the network node includes the following.

The BGP FS rule fails in BGP verification, and/or the BGP FS rule fails in BGP FS verification.

In an implementation, the BGP FS rule failing in the BGP verification includes the following.

The BGP FS rule carries an invalid parameter.

In an implementation, the BGP FS rule failing in the BGP FS verification includes any one or more of the following.

The BGP FS rule does not meet a preset implementation condition, an effective interface carried in the BGP FS rule does not match an interface of the network node, and the BGP FS rule conflicts with a security protection policy run on the network node.

In an implementation, the apparatus 500 further includes an operation unit configured to perform a first operation based on the status, or a sending unit configured to send the status to a second server, so that the second server performs a first operation based on the status.

In an implementation, the operation unit is further configured to control a display device to display the status.

In an implementation, the operation unit is further configured to modify the BGP FS rule based on the status, and send a modified BGP FS rule to the network node.

In an implementation, the operation unit is further configured to send a first configuration instruction to the network node based on the status, where the first configuration instruction is used to configure the network node.

In an implementation, the operation unit is further configured to, if the status is that the BGP FS rule fails in BGP verification, determine an invalid parameter carried in the BGP FS rule, and modify the invalid parameter to a valid parameter.

In an implementation, the operation unit is further configured to, if the status is that an effective interface carried in the BGP FS rule does not match an interface of the network node, modify the effective interface carried in the BGP FS rule to an interface matching the interface of the network node.

In an implementation, the operation unit is further configured to, if the status is that the BGP FS rule conflicts with a security protection policy, modify the BGP FS rule to a BGP FS rule that does not conflict with the security protection policy.

In an implementation, the operation unit is further configured to, if the status is that the BGP FS rule does not meet a preset implementation condition, send the first configuration instruction to the network node, where the first configuration instruction is used to instruct the network node to reconfigure a target parameter, so that the BGP FS rule meets the preset implementation condition, or the first configuration instruction is used to configure the network node to cancel verifying whether the BGP FS rule meets the preset implementation condition.

In an implementation, the obtaining unit 501 is further configured to obtain traffic matching information of the BGP FS rule, where the traffic matching information is related information of data traffic matching the BGP FS rule.

The storage unit 502 is further configured to store the traffic matching information.

In an implementation, the operation unit is further configured to perform a second operation based on the traffic matching information, or the sending unit is further configured to send the traffic matching information to a second server, so that the second server performs a second operation based on the traffic matching information.

In an implementation, the operation unit is further configured to control the display device to display the traffic matching information.

In an implementation, the operation unit is further configured to determine whether the traffic matching information meets a preset condition, and if the traffic matching information does not meet the preset condition, modify the BGP FS rule based on the traffic matching information, and send a modified BGP FS rule to the network node.

In an implementation, the operation unit is further configured to send a second configuration instruction to the network node based on the traffic matching information, where the second configuration instruction is used to configure the network node.

In an implementation, the operation unit is further configured to, if the status includes a priority of the BGP FS rule is lower than a priority of another traffic control policy, send the second configuration instruction to the network node, where the second configuration instruction is used to configure the network node to cancel implementing the other traffic control policy, or is used to configure the network node to preferentially implement the BGP FS rule.

In an implementation, the apparatus 500 further includes an analysis unit configured to before the second configuration instruction is sent to the network node, analyze data traffic passing through the network node, to obtain an analysis result.

Correspondingly, the operation unit is further configured to, if the analysis result indicates that abnormal traffic exists in the data traffic passing through the network node, send the second configuration instruction to the network node.

In an implementation, the operation unit is further configured to modify the BGP FS rule if the status does not include the priority of the BGP FS rule is lower than a priority of another traffic control policy.

In an implementation, the operation unit is further configured to analyze a configuration parameter of the BGP FS rule to determine whether a parameter combination that causes the BGP FS rule to fail to take effect exists, and modify the parameter combination if the parameter combination exists, so that a modified BGP FS rule takes effect.

In an implementation, the operation unit is further configured to analyze the data traffic passing through the network node, and modify the BGP FS rule based on an analysis result.

In an implementation, the sending unit is further configured to send a status report instruction to the network node, where the status report instruction is used to instruct the network node to report the status of implementing the BGP FS rule on the network node to the data processing apparatus.

In an implementation, the sending unit is further configured to send a traffic information report instruction to the network node, where the traffic information report instruction is used to instruct the network node to report the traffic matching information of the BGP FS rule to the data processing apparatus, and the traffic matching information is related information of data traffic matching the BGP FS rule.

In an implementation, the sending unit is further configured to, when the status received by the data processing apparatus is that the BGP FS rule is implemented on the network node, send the traffic information report instruction to the network node.

The apparatus 500 is an apparatus corresponding to the data processing method performed by the first server in the foregoing method embodiments, and specific implementation of each unit of the apparatus 500 has a same concept as that of the foregoing method embodiments. Therefore, for specific implementation of each unit of the apparatus 500, refer to the description of the data processing method performed by the first server in the foregoing method embodiments. Details are not described herein again.

The embodiments of this application further provide an information reporting device. The device includes a processor and a memory. The memory is configured to store instructions, and the processor is configured to execute the instructions in the memory, to perform the information reporting method performed by the network node in the foregoing method embodiments. In some embodiments, the information reporting device may be any network device in FIG. 1.

The embodiments of this application further provide a data processing device. The device includes a processor and a memory. The memory is configured to store instructions, and the processor is configured to execute the instructions in the memory, to perform the data analysis method performed by the first server in the foregoing method embodiments. In some embodiments, the data analysis device may be the server 200 or the server 300 in FIG. 1.

Figure 6:
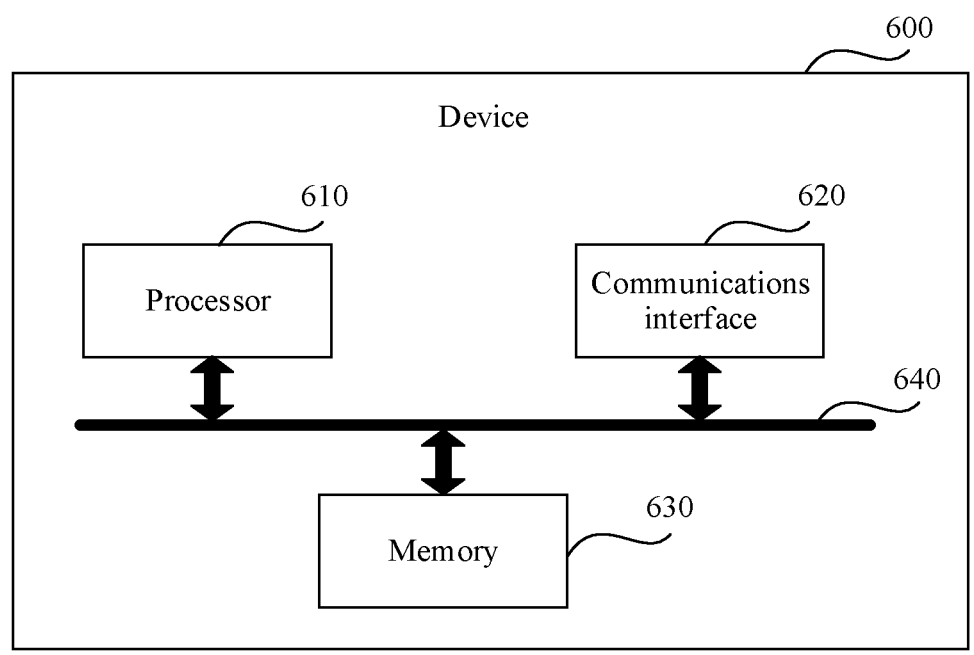
FIG. 6 is a schematic diagram of a structure of a device according to an embodiment of this application.

It should be noted that hardware structures of the information reporting device and the data processing device may be structures shown in FIG. 6. FIG. 6 is a schematic diagram of a structure of a device according to an embodiment of this application.

Refer to FIG. 6. The device 600 includes a processor 610, a communications interface 620, and a memory 630. The device 600 may include one or more processors 610. In FIG. 6, one processor is used as an example. In this embodiment of this application, the processor 610, the communications interface 620, and the memory 630 may be connected through a bus system or in another manner. In FIG. 6, for example, a bus system 640 is used for connection.

The processor 610 may be a central processing unit (CPU), a network processor (NP), or a combination of a CPU and an NP. The processor 610 may further include a hardware chip. The hardware chip may be an application-specific integrated circuit (ASIC), a programmable logic device (PLD), or a combination thereof. The PLD may be a complex PLD (CPLD), a field-programmable gate array (FPGA), generic array logic (GAL), or any combination thereof. If the device 600 is the information reporting device in the foregoing embodiments, the processor 610 may perform steps performed by units such as the obtaining unit 401 and the sending unit 402. If the network device 600 is the data processing device in the foregoing embodiments, the processor 610 may perform steps performed by units such as the obtaining unit 501 and the storage unit 502.

The memory 630 may include a volatile memory, for example, a random-access memory (RAM). The memory 630 may also include a non-volatile memory, for example, a flash memory, a hard disk drive (HDD), or a solid-state drive (SSD). The memory 630 may further include a combination of the foregoing types of memories.

If the device 600 is the information reporting device in the foregoing embodiments, the memory 630 may store the BGP FS rule and the like in the foregoing embodiments. If the network device 600 is the data processing device in the foregoing embodiments, the memory 630 may store the status of implementing the BGP FS rule on the network node and the like in the foregoing embodiments.

Optionally, the memory 630 stores an operating system and a program, an executable module or a data structure, or a subset thereof, or an extended set thereof. The program may include various operation instructions, and is used to implement various operations. The operating system may include various system programs for implementing various basic services and processing hardware-based tasks. The processor 610 may read the program in the memory 630, to implement the information reporting method provided in the embodiments of this application.

The bus system 640 may be a Peripheral Component Interconnect (PCI) bus, an Extended Industry Standard Architecture (EISA) bus, or the like. The bus system 640 may be classified into an address bus, a data bus, a control bus, or the like. For ease of representation, only one thick line is used to represent the bus in FIG. 6, but this does not mean that there is only one bus or only one type of bus.

The embodiments of this application further provide a computer-readable storage medium including instructions. When the instructions are run on a computer, the computer is enabled to perform the information reporting method performed by the network node in the foregoing embodiments.

The embodiments of this application further provide a computer-readable storage medium including instructions. When the instructions are run on a computer, the computer is enabled to perform the data processing method performed by the first server in the foregoing embodiments.

The embodiments of this application further provide a computer program product including a program. When the computer program product is run on a computer, the computer is enabled to perform the information reporting method performed by the network node in the foregoing embodiments.

The embodiments of this application further provide a computer program product including a program. When the computer program product is run on a computer, the computer is enabled to perform the data processing method performed by the first server in the foregoing embodiments.

In this specification, the claims, and the accompanying drawings of this application, terms "first", "second", "third", "fourth", and the like (if existent) are intended to distinguish between similar objects but do not necessarily indicate a specific order or sequence. It should be understood that the data termed in such a way are interchangeable in an appropriate circumstance, so that the embodiments described herein can be implemented in another order than the order illustrated or described herein. Moreover, terms "include", "have", and any other variants thereof mean to cover non-exclusive inclusion. For example, a process, method, system, product, or device that includes a list of steps or units is not necessarily limited to those steps or units, but may include other steps or units not expressly listed or inherent to such a process, method, product, or device.

It may be clearly understood by a person skilled in the art that, for purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical service division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, service units in the embodiments of this application may be integrated into one processing unit, or each of the units may exist alone physically, or two or more units are integrated into one unit. The integrated unit may be implemented in a form of hardware, or may be implemented in a form of a software service unit.

When the service unit is implemented in the form of a software functional unit and sold or used as an independent product, the integrated unit may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several programs that enable a computer device (which may be a personal computer, a server, a network device, or the like) to perform all or some of the steps of the methods in the embodiments of this application. The foregoing storage medium includes various media that can store program code, such as a Universal Serial Bus (USB) flash drive, a removable hard disk, a read-only memory (ROM), a RAM, a magnetic disk, or an optical disc.

Persons skilled in the art should be aware that in the foregoing one or more examples, the services described in the present disclosure may be implemented by hardware, software, firmware, or any combination thereof. When the services are implemented by software, the services may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general-purpose or dedicated computer.

The objectives, technical solutions, and beneficial effects of the present disclosure have been described in further detail in the foregoing specific implementations. It should be understood that the foregoing descriptions are merely specific implementations of the present disclosure.

The foregoing embodiments are merely intended for describing the technical solutions of this application instead of limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method implemented by a network node, wherein the method comprises:
obtaining a status of the network node, wherein the status indicates whether a Border Gateway Protocol (BGP) flow specification (FS) rule is implemented on the network node; and
sending the status to a server.

2. The method of claim 1, further comprising:
adding the status to a route monitoring (RM) message; and
further sending the status in the RM message.

3. The method of claim 1, further comprising either:
normally implementing the BGP FS rule; or
abnormally implementing the BGP FS rule.

4. The method of claim 1, further comprising:
identifying that the BGP FS rule has failed in a BGP verification; or
identifying that the BGP FS rule has failed in a BGP FS verification.

5. The method of claim 1, wherein when the status indicates that the BGP FS rule is implemented on the network node, and wherein the method further comprises:
obtaining traffic matching information of the BGP FS rule, wherein the traffic matching information is related information of data traffic matching the BGP FS rule; and
sending the traffic matching information to the server.

6. The method of claim 5, further comprising:
adding the traffic matching information to a status report (SR) message; and
sending the SR message to the server.

7. The method of claim 6, further comprising:
receiving a traffic information report instruction from the server; and
obtaining, in response to receiving the traffic information report instruction, the traffic matching information.

8. The method of claim 1, further comprising:
receiving a status report instruction from the server; and
obtaining, in response to receiving the status report instruction, the status.

9. A method implemented by a first server, wherein the method comprises:
obtaining a status of a network node, wherein the status indicates whether a first Border Gateway Protocol (BGP) flow specification (FS) rule is implemented on the network node; and
storing the status.

10. The method of claim 9, further comprising:
performing a first operation based on the status; or
sending the status to a second server to enable the second server to perform the first operation based on the status.

11. The method of claim 9, further comprising:
controlling a display device to display the status;
modifying the first BGP FS rule based on the status to obtain a modified BGP FS rule and sending the modified BGP FS rule to the network node; or
sending a first configuration instruction to the network node based on the status.

12. The method of claim 11, further comprising:
when the status indicates that the first BGP FS rule has failed in a BGP verification:
determining an invalid parameter carried in the first BGP FS rule; and
modifying the invalid parameter to a valid parameter;
modifying an effective interface carried in the first BGP FS rule to a first interface matching a second interface of the network node when the status indicates that the effective interface does not match the second interface; and
modifying the first BGP FS rule to a second BGP FS rule that does not conflict with a security protection policy when the status indicates that the BGP FS rule conflicts with the security protection policy.

13. The method of claim 11, further comprising:
identifying that the status indicates that the first BGP FS rule does not meet a preset implementation condition; and
sending, in response to identifying that the status indicates that the first BGP FS rule does not meet the preset implementation condition, the first configuration instruction to the network node, wherein the first configuration instruction either instructs the network node to reconfigure a target parameter so that the BGP FS rule satisfies the preset implementation condition or instructs the network node to cancel verifying whether the first BGP FS rule meets the preset implementation condition.

14. The method of claim 9, further comprising:
obtaining traffic matching information of the first BGP FS rule, wherein the traffic matching information is related information of data traffic matching the first BGP FS rule; and
storing the traffic matching information.

15. The method of claim 14, further comprising:
performing a second operation based on the traffic matching information; or
sending the traffic matching information to a second server to enable the second server to perform the second operation based on the traffic matching information.

16. An apparatus comprising:
a processor; and
a memory coupled to the processor and configured to store instructions, wherein when executed by the processor, the instructions cause the apparatus to:
obtain a status of a network node, wherein the status indicates whether a Border Gateway Protocol (BGP) flow specification (FS) rule is implemented on the network node; and
send the status to a server.

17. The apparatus of claim 16, wherein when executed by the processor, the instructions further cause the apparatus to:
add the status to a route monitoring (RM) message; and
send the RM message to the server.

18. An apparatus comprising:
a processor; and
a memory coupled to the processor and configured to store instructions, wherein when executed by the processor, the instructions cause the apparatus to:
obtain a status of a network node, wherein the status indicates whether a Border Gateway Protocol (BGP) flow specification (FS) rule is implemented on the network node; and
store the status.

19. The apparatus of claim 18, wherein when executed by the processor, the instructions further cause the apparatus to:
perform a first operation based on the status; or
send the status to a second server to enable the second server to perform the first operation based on the status.

20. The apparatus of claim 18, wherein when executed by the processor, the instructions further cause the apparatus to:
obtain traffic matching information of the BGP FS rule, wherein the traffic matching information is related information of data traffic matching the BGP FS rule; and
store the traffic matching information.

* * * * *